United States Patent [19]

Brady et al.

[11] Patent Number: 5,727,144

[45] Date of Patent: Mar. 10, 1998

[54] FAILURE PREDICTION FOR DISK ARRAYS

[75] Inventors: James Thomas Brady; Jaishankar Moothedath Menon, both of San Jose, Calif.

[73] Assignee: International Business Machines Corporation, Armonk, N.Y.

[21] Appl. No.: 679,166

[22] Filed: Jul. 12, 1996

Related U.S. Application Data

[63] Continuation of Ser. No. 356,807, Dec. 15, 1994, abandoned.

[51] Int. Cl.$^6$ ................................................. G06F 11/00
[52] U.S. Cl. ........................... 395/182.04; 395/185.1
[58] Field of Search .................... 395/182.04, 182.03, 395/182.05, 185.1, 185.01, 441, 438, 181

[56] References Cited

U.S. PATENT DOCUMENTS

| | | | |
|---|---|---|---|
| 4,589,080 | 5/1986 | Abbott et al. | 346/552 |
| 4,866,712 | 9/1989 | Chao | 317/5.1 |
| 4,894,565 | 1/1990 | Marquardt | 307/518 |
| 4,922,491 | 5/1990 | Coale | 371/16.1 |
| 4,932,028 | 6/1990 | Katircioglu et al. | 371/16.5 |
| 5,016,128 | 5/1991 | DiIorio et al. | 360/97.01 |
| 5,040,157 | 8/1991 | Roderick et al. | 367/119 |
| 5,046,034 | 9/1991 | Stark et al. | 346/580 |
| 5,090,014 | 2/1992 | Polich et al. | 371/15.1 |
| 5,117,314 | 5/1992 | Bathaee et al. | 360/51 |
| 5,121,263 | 6/1992 | Kerwin et al. | 360/53 |
| 5,210,704 | 5/1993 | Husseiny | 346/551.01 |
| 5,235,600 | 8/1993 | Edwards | 371/22.3 |
| 5,268,845 | 12/1993 | Startup et al. | 364/483 |
| 5,271,012 | 12/1993 | Blaum et al. | 395/182.04 |
| 5,301,297 | 4/1994 | Menon et al. | 395/425 |
| 5,357,509 | 10/1994 | Ohizumi | 395/182.05 |
| 5,379,411 | 1/1995 | Morgan et al. | 395/182.04 |
| 5,390,327 | 2/1995 | Lubbers et al. | 371/40.1 |
| 5,402,428 | 3/1995 | Kakuta et al. | 395/182.04 |
| 5,500,940 | 3/1996 | Skeie | 395/183.01 |
| 5,566,316 | 10/1996 | Fechner et al. | 395/441 |

OTHER PUBLICATIONS

*Research Disclosure*, RD33590, "Array Failure Prediction," Mar. 10, 1992.
*Research Disclosure*, RD32272, "In Situ Head–Asperity Contact Detection," Feb. 10, 1991.
*Technical Disclosure Bulletin*, "Detection of Outliers for Predictive Failure Analysis of DASD," vol. 36, n. 11, Nov., 1993, p. 299.
"Recent Secondary Devices Disc Array," Joho Shori, (Japan; in Japanese) vol. 34, No. 5, May 1993, pp. 642–651.
"Analysis of Damage Propagation and Ultimate Failure in Laminated Composite Flywheels," McLaughlin, et al., Proc. 20th Intersociety Energy Conversion Engineering Conf. for the 21st Century, SAE, Warrendale, PA, vol. 2, 1985, pp. 544–551.
"Disk Scheduling: Theoretical vs. Practical Considerations," Pinkerton, 7th Hawaiian Inter. Conf. on Syst. Sciences, 8–10 Jan. 1974, pp. 64–66.
"Design and Modeling of Clustered RAID," Merchant et al., Digest of Papers, 1992 IEEE Workshop on Fault Tolerant Computing, IEEE Comput. Soc. Press, Jul. 1992, pp. 140–149.

(List continued on next page.)

*Primary Examiner*—Robert W. Beausoliel, Jr.
*Assistant Examiner*—Joseph E. Palys
*Attorney, Agent, or Firm*—Raymond M. Galasso; Jenkens & Gilchrist; Ingrid M. Foerster

[57] ABSTRACT

In a data processing system employing a disk array, prediction of a possible failure of a disk drive initiates copying of the data away from the potentially failing disk drive to a spare disk drive before the failing drive actually fails. If the disk drive does fail before the copying of the contents to a spare disk drive is completed, rebuilding of the remaining contents within the failing disk drive is performed.

11 Claims, 2 Drawing Sheets

OTHER PUBLICATIONS

"An evaluation of the Kirchhoff approximation in predicting the axial impulse response of hard and soft disks," Norton, et al., *J. Acoust. Soc. Am.*, vol. 93, No. 6, Jun. 1993, pp. 3049–3056.

"Reliability Analysis of Redundant Arrays of Inexpensive Disks," Malhotra, et al., *J. Parallel Distrib. Comput.*, vol. 171, No. 1–2, Jan.–Feb. 1993, pp. 146–151.

"Trend Analysis on System Error Files," Tsao, et al., FTCS 13th Annual Inter. Symp. Fault Tolerant Computing Dig. of Papers, IEEE, New York, 1983, pp. 116–119.

"A Case for Redundant Arrays of Inexpensive Disks (RAID)," Patterson et al., Comput. Science Div. (EECS), Univ. of Calif. (Berkeley), Report No. UCB/CSD 87/391, Dec. 1987.

FAILURE PREDICTION FOR DISK ARRAYS

This application is a continuation of application Ser. No. 08/356,807, filed on Dec. 15, 1994, which was abandoned upon the filing hereof.

TECHNICAL FIELD OF THE INVENTION

The present invention relates in general to data processing systems, and in particular, to a system and method for copying data away from a failing disk drive before the failing disk drive actually fails.

BACKGROUND OF THE INVENTION

Drive arrays work on the theory that two hard drives are better than one, and N hard drives are N times as good. By using multiple hard drives configured so the operating system believes there is only a single drive, a computer can achieve greater speed reading data from the drives or greater protection from data loss. Arrays may also configure multiple drives to appear as multiple drives to a data processing system.

The most common type of drive array is a RAID, an acronym for "redundant array of inexpensive (independent) drives." The cost of hard drives typically increases with capacity and speed. But with a RAID, several less expensive drives whose total cost is less than one high-performance drive can be used to attain a similar performance with greater security. RAIDs use some combination of mirroring and/or striping for providing greater protection from lost data. Mirroring provides that one drive is a direct copy of another drive. In striping, files are spread over several drives and protected with parity data on yet another drive. Note, one can perform parity without striping and vice versa, such as in a RAID 0 system described below.

Please refer to U.S. Pat. No. 4,761,785 and "A Case for Redundant Arrays of Inexpensive Disks (RAID)," Patterson et al., Report No. UCB/CSD 87/391, Computer Science Division (EECS), Univ. of California, Berkeley, Calif., December 1987, which are hereby incorporated by reference herein, for further discussions on RAID.

In an N+1 disk array, performance in a computer system suffers when a disk drive fails, until the contents of the drive have been rebuilt to a spare disk drive. Until a rebuilding of the contents has completed, performance of user requests for data on the failed drive is poor, since it requires reading data from the surviving N disks and XORing that read data in order to produce the data requested by the user. Rebuilding the failed disk is done in the background when there is no user request to process. It requires reading N disks from beginning to end and writing one disk from beginning to end. A second disk failure during rebuild causes data to be lost.

Thus, there is a need in the art for an improved system and method for rebuilding data away from a failing drive within a disk array.

SUMMARY OF THE INVENTION

Therefore, it is an objective of the present invention to copy data away from a failing disk drive before that disk drive actually fails.

In an attainment of the above objective, the present invention comprises a data processing system having a processor, a display device, an input/output means, and a disk array of a plurality of disks coupled by a bus to the processor, wherein the system includes a means for generating and/or receiving a warning of a possible failure in one of the disks within the disk array, and a means for copying the contents of the disk about to fail to a second disk or multiple disks within the disk array.

In an alternative embodiment, the present invention also includes a means for rebuilding those portions of the contents of the failing disks that were not copied to the spare disk upon the occurrence of a complete failure of the failing disk.

In yet another alternative embodiment of the present invention, when a third disk within the disk array fails during the above copying of the contents of the failing disk to the spare disk, the system transfers the copying state to a higher priority copying state, wherein the copying of the contents of the failing disk to the spare disk takes precedence over the processing of other user requests within the data processing system. Then, upon completion of the copying under this higher priority copying state, the system rebuilds the contents of the third disk to fail.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
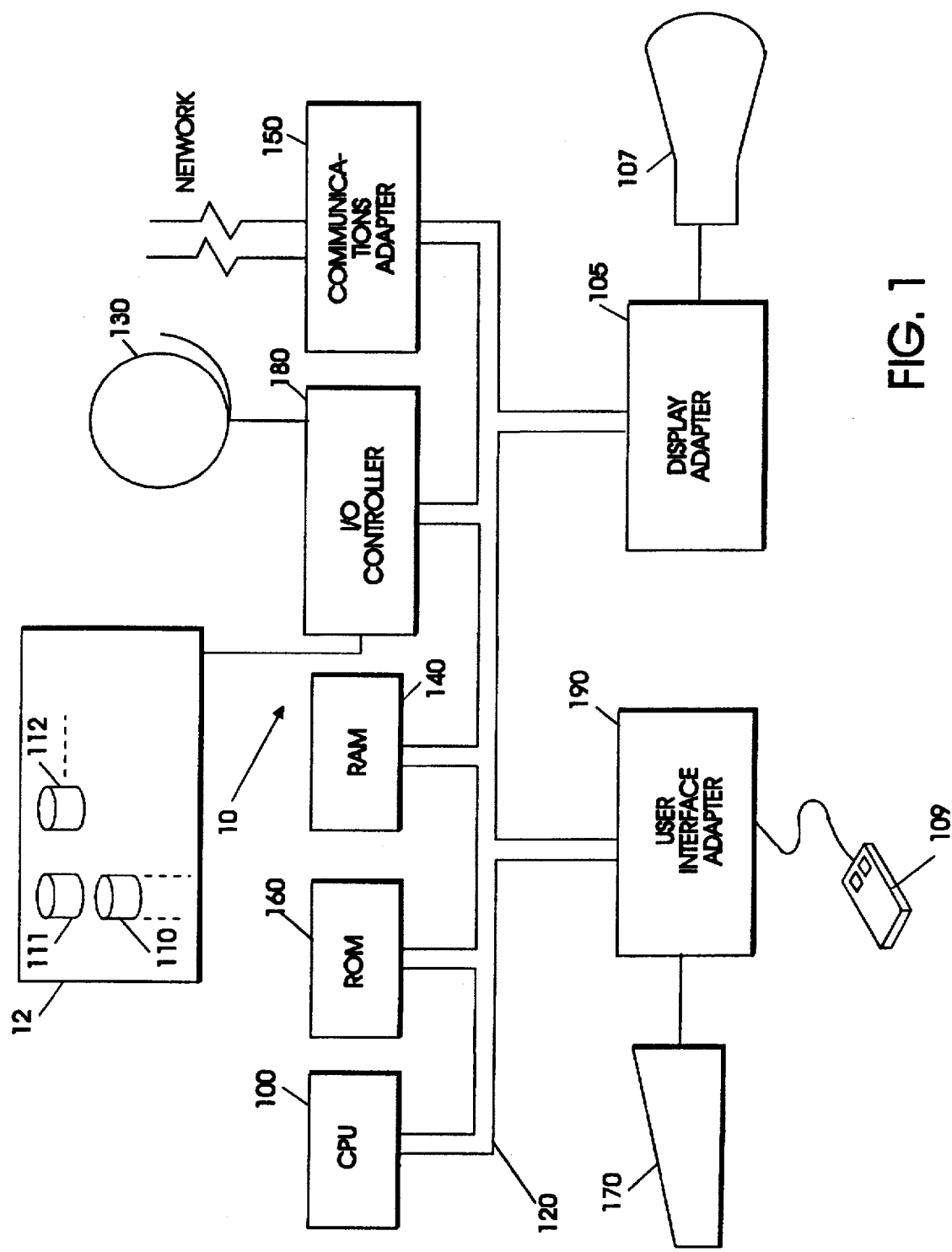
FIG. 1 illustrates a data processing system configured with a disk array.

A representative hardware environment for practicing the present invention is depicted in FIG. 1, which illustrates a typical hardware configuration of workstation 10 in accordance with the subject invention having central processing unit 100, such as a conventional microprocessor, and a number of other units interconnected via system bus 120. Workstation 10 includes random access memory (RAM) 140, read only memory (ROM) 160, and input/output (I/O) adapter 180 for connecting peripheral devices such as disk array 12 of disk units 110, 111, 112 and tape drives 130 to bus 120, user interface adapter 190 for connecting keyboard 170, mouse 109, and/or other user interface devices such as a touch screen device (not shown) to bus 120, communications adapter 150 for connecting workstation 10 to a data processing network, and display adapter 105 for connecting bus 120 to display device 107.

An advantage of the present invention is the ability to predict when a drive within disk array 12 is about to fail, then copy the data away from the failing drive to a spare drive before the failing drive actually fails. In other words, instead of waiting until a disk drive fails, then rebuilding data and writing to a spare drive, the present invention predicts that a drive will soon fail, and then copies data away from the soon to fail drive to a spare drive.

Alternatively, the data copied away from the failing drive may be copied to spare space on multiple drives if distributed sparing is implemented within the system. Please refer to "Distributed Sparing in Disk Arrays," Menon & Mattson, Compcon 92, Feb. 24–28, 1992, pp. 410–421, for a discussion on distributed sparing. Thus, instead of one spare disk, spare space on multiple disks are utilized to add up to one disk's worth of spare space.

Figure 2:
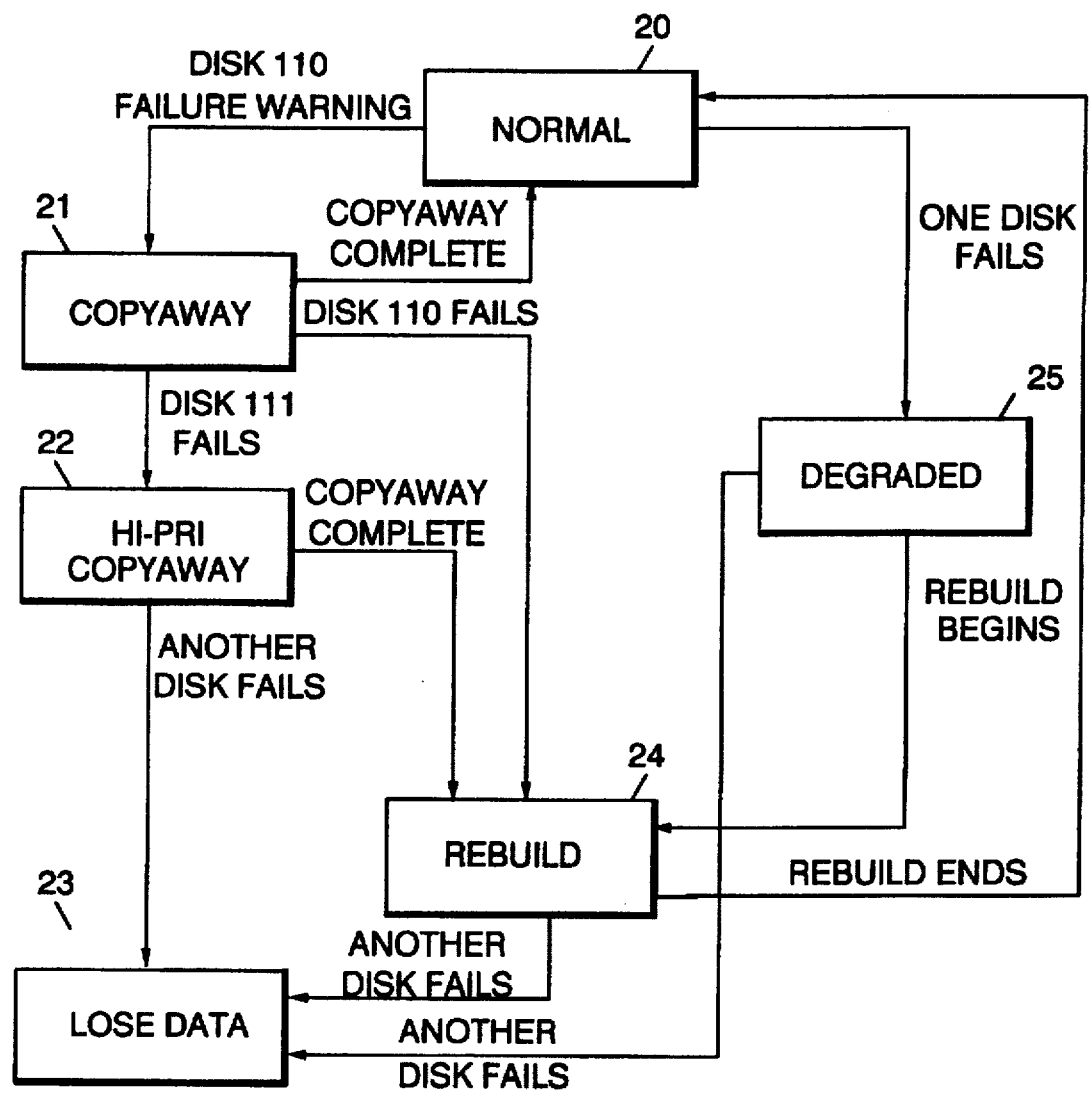
FIG. 2 illustrates a state diagram of a preferred embodiment of the present invention.

Referring next to FIG. 2, there is illustrated a state diagram of a preferred embodiment of the present invention. The state diagram represents the flow of the present invention embodied within software and implemented within either disk array 12, I/O controller 180 or CPU 100. System 10 is implemented with disk array 12 of N disk drives (drives 110, 111, 112 are shown). Disk array 12 may be comprised of an N×M array of disk drives.

When all N disks of disk array 12 are operational, disk array 12 is in normal state 20. When a disk fails (e.g., disk 110), array 12 operates in degraded state 25. As soon as array 12 begins rebuilding the contents of failed disk 110 to spare disk 112, it proceeds to rebuild state 24. When rebuild completes, disk array 12 returns to normal state 20. These are the typical states and transitions of an array without implementation of the present invention. Please refer to "Comparison of Sparing Alternatives for Disk Arrays," Menon & Mattson, IBM Almaden Research Report, RJ 8431, Oct. 24, 1991, for a discussion of these typical states and transitions.

During rebuilding of a N+1 array when one drive fails, there is one task (or process) started for each of the N drives. This task does the following on each of the surviving N drives.

(1) Wait until an idle situation.

(2) Set "last unit read" to 0 (unit may be one sector, one track, two tracks, etc.; one track is preferred).

(3) If "last unit read" equals T (units per drive), then "done." Else, increment "last unit read" by 1.

(4) Read next unit to be used for rebuilding from drive into buffer on controller if space is available in buffer. If no space is available in buffer, then wait until space becomes available, then read unit into buffer in controller.

(5) Check for any other work that has arrived for disk drive while reading previous unit. If other work has arrived, go do other work and return here when idle. If no other work has arrived, continue. (Note: Rebuilding is background work; if any other foreground work has arrived, those should be handled first).

(6) Go to step 3.

In addition to N tasks above, there is also a Buffer Handler Task, which performs the following:

(1) Set "last unit rebuilt" to 0.

(2) If "last unit rebuilt" equals T (units per drive), then "done." Else, increment "last unit rebuilt" by 1.

(3) Check to see if unit number "last unit rebuilt" is available from all N drives in buffer. Wait until all are available in buffer. When all are available in buffer, XOR these N units to produce rebuilt unit for writing to spare drive.

(4) Write rebuilt unit to spare drive at position "last unit rebuilt."

(5) Remove the N units that were XORed together to produce rebuilt unit from the buffer, freeing up buffer space.

(6) Go to step 2.

In the above algorithm, it was assumed that there was one spare disk. However, "distributed sparing," as discussed herein, may be utilized.

With the present invention, when all disks are operational, disk array 12 is operating in normal state 20, as before. When a warning of an imminent disk failure is received, the present invention proceeds to copyaway state 21, wherein data is copied away from failing drive 110 to spare drive 112. When copyaway completes, the present invention returns to normal mode 20. It is well-known by those skilled in the art how to copy contents of drive 110 to drive 112.

Failing disk 110 may fail before the copyaway procedure is completed. In that case, a transition to rebuild mode 24 is performed, wherein a rebuilding of those portions of disk drive 110 that had not yet been copied away is performed.

Another error situation shown is when a disk other than the one for which the warning was initiated fails without warning (e.g., disk 111). For example, assume that a warning was initiated because of a pending failure of disk 110, which initiated I/O controller 180 to begin copying away from disk 110 to disk 112 in copyaway mode 21. During copyaway of disk 110, suppose that disk 111 fails. In this instance, a transition is made to the high priority copyaway state 22, where copyaway is given high priority and is no longer done in the background. This is because if disk 110 were to fail before copyaway of 110 completes, data would be lost. If copyaway does complete before disk 110 fails, a transition is made to rebuild state 24 where the contents of failed disk 111 are rebuilt.

Note that if a disk fails without a warning, a transition is made to degraded state 25. After degraded state 25, a transition is made to rebuild state 24 to rebuild the failed disk.

Note further that from high priority copyaway state 22, degraded state 25 and rebuild state 24, if another disk fails during any one of these three states, data will be lost (state 23).

As noted above, the present invention operates on the ability to predict an imminent failure of a disk.

The types of error analyses that may be performed are Head Flyheight Analysis and Error Log Analysis, which are both performed by the disk drive. They are both done automatically by the disk drive when idle, or when it is trying to recover from failures. In Head Flyheight Analysis, the microcode determines the fly height of the read/write head above the disk surface. Failure is predicted if flyheight is determined to be too low. In Error Log Analysis, the error log maintained by the drive is analyzed. Errors recovered in the log by the drive include: seek errors, sector reassigns caused by bad sectors, etc. Error Log Analysis checks to see if seek error rate or sector reassign rate has exceeded certain thresholds. If so, failure is predicted.

The disk drive sends predictions of failures back to controller 180, which implements the present invention illustrated in FIG. 2, either by hardware or software.

A disk drive performs predictive failure analysis during idle periods and as part of error recovery. When one of the tests detects an anomaly suggesting a possible imminent failure, the disk drive sends a check condition status to controller 180 following an otherwise successful read or write command. The present invention makes use of this check condition status that will be reported by the drives to trigger the copyaway of data on the failing disk.

The present invention may also be used in disk subsystems that are not arrayed. For example, RAID 0 subsystems, or subsystems which do not have the array function, can use the technique described herein. In a RAID 0 system, the states associated with one disk failures (states 22, 24, 25) do not exist. The state diagram collapses to state 20 (normal), which can transition to state 21 (copyaway) when there is a failure warning, or to state 23 (lose data) if there is a one disk failure. State 21 (copyaway) can transition back to state 20 (normal) upon completion of the copy, or to state 23 (lose data) if the disk fails before completion of the copyaway. RAID 0 systems do not have a parity device, but do stripe the data over multiple disk drives. Hence, the failure of one drive results in the failure of the subsystem.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a uniprocessor or a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. In a data processing system comprising a processor coupled to an array of a plurality of storage devices, a method comprising the steps of:

receiving a warning of a possible failure in a first one of said plurality of storage devices;

copying, in response to receipt of said warning of a possible failure in said first one of said plurality of storage devices, contents of said first one of said plurality of storage devices to a second one of said plurality of storage devices; and when a third of said plurality of said storage devices fails during said step of copying of said contents of said first one of said plurality of storage devices to a second one of said plurality of storage devices, transferring said step of copying of said contents of said first one of said plurality of storage devices to a second one of said plurality of storage devices to a higher priority copying step wherein said step of copying of said contents of said first one of said plurality of storage devices to a second one of said plurality of storage devices takes precedence over rebuilding contents of said third of said plurality of said devices and processing of user requests within said data processing system.

2. The method as recited in claim 1, further comprising the step of:

rebuilding those portions of said contents of said first one of said plurality of storage devices that were not copied to said second one of said plurality of storage devices when said first one of said plurality of storage devices fails before said step of copying of said contents of said first one of said plurality of storage devices to a second one of said plurality of storage devices is completed.

3. The method as recited in claim 1, further comprising the step of:

upon completion of said higher priority copying step wherein said step of copying of said contents of said first one of said plurality of storage devices to a second one of said plurality of storage devices takes precedence over rebuilding contents of said third of said plurality of said storage devices and processing of user requests within said data processing system, rebuilding contents of said third of said plurality of said storage devices.

4. The method as recited in claim 1, wherein said array is a disk array and said plurality of storage devices is a plurality of hard disks.

5. A data processing system comprising a processor coupled to an array of a plurality of storage devices, said system comprising:

means for receiving a warning of a possible failure in a first one of said plurality of storage devices;

means for copying, in response to receipt of said warning of a possible failure in said first one of said plurality of storage devices, contents of said first one of said plurality of storage devices to a second one of said plurality of storage devices; and when a third of said plurality of said storage devices fails during said copying of said contents of said first one of said plurality of storage devices to a second one of said plurality of storage devices, means for transferring said copying of said contents of said first one of said plurality of storage devices to a second one of said plurality of storage devices to a higher priority copying state wherein said copying of said contents of said first one of said plurality of storage devices to a second one of said plurality of storage devices takes precedence over rebuilding contents of said third of said plurality of said storage devices and processing of user requests within said data processing system.

6. The system as recited in claim 5, further comprising:

means for rebuilding those portions of said contents of said first one of said plurality of storage devices that were not copied to said second one of said plurality of storage devices when said first one of said plurality of storage devices fails before said copying of said contents of said first one of said plurality of storage devices to a second one of said plurality of storage devices is completed.

7. The system as recited in claim 5, wherein said array is a disk array and said plurality of storage devices is a plurality of hard disks.

8. The system as recited in claim 5, further comprising:

upon completion of said higher priority copying state wherein said copying of said contents of said first one of said plurality of storage devices to a second one of said plurality of storage devices takes precedence over rebuilding contents of said third of said third of said plurality of said storage devices and processing of user requests within said data processing system, means for rebuilding contents of said third of said plurality of said storage devices.

9. The system as recited in claim 5, further comprising a display device and input/output means coupled by a bus to said processor.

10. The system as recited in claim 5, further comprising:
means for generating said warning.

11. A data processing system comprising a processor, a display device, an input/output means, and a disk array of a plurality of disks coupled by a bus to said processor, said system comprising:

means for generating a warning of a possible failure in a first one of said plurality of disks;

means for receiving said warning;

means for copying, in response to receipt of said warning of a possible failure in said first one of said plurality of disks, contents of said first one of said plurality of disks to a second one of said plurality of disks;

means for rebuilding those portions of said contents of said first one of said plurality of disks that were not copied to said second one of said plurality of disks when said first one of said plurality of disks fails before said copying of said contents of said first one of said plurality of disks to a second one of said plurality of disks is completed;

when a third of said plurality of said disks fails during said copying of said contents of said first one of said plurality of disks to said second one of said plurality of disks, means for transferring said copying of said contents of said first one of said plurality of disks to said second one of said plurality of disks to a higher priority copying state wherein said copying of said contents of said first one of said plurality of disks to said second one of said plurality of disks takes precedence over rebuilding contents of said third of said plurality of said disks and processing of user requests within said data processing system; and upon completion of said higher priority copying state wherein said copying of said contents of said first one of said plurality of disks to said second one of said plurality of disks takes precedence over rebuilding contents of said third of said plurality of said disks and processing of user requests within said data processing system, means for rebuilding contents of said third of said plurality of said disks.

* * * * *